United States Patent [19]
Ohkita et al.

[11] Patent Number: 4,772,973
[45] Date of Patent: Sep. 20, 1988

[54] LOADING/EJECTING MECHANISM IN DISK DRIVING DEVICE HAVING SLIDING PLATE BELOW THE TURNTABLE MOTOR

[75] Inventors: Masao Ohkita; Shinichi Omori, both of Furukawa, Japan

[73] Assignee: ALPS Electric Co., Ltd., Japan

[21] Appl. No.: 884

[22] Filed: Jan. 6, 1987

[30] Foreign Application Priority Data

Feb. 28, 1986 [JP] Japan .................................. 61-41455

[51] Int. Cl.⁴ ............................................ G11B 17/04
[52] U.S. Cl. ....................................... 360/97; 360/99; 360/96.5
[58] Field of Search ................... 369/97, 99, 133, 96.5

[56] References Cited
U.S. PATENT DOCUMENTS

| | | | |
|---|---|---|---|
| 4,466,032 | 8/1984 | Saito | 360/99 |
| 4,688,123 | 8/1987 | Sokol et al. | 360/97 |
| 4,688,125 | 8/1987 | Nomoto et al. | 360/97 X |

*Primary Examiner*—John H. Wolff
*Attorney, Agent, or Firm*—Guy W. Shoup; Paul J. Winters

[57] ABSTRACT

A disk driving device having a reduced thickness and formed in a compact construction, comprising a cartridge holder for holding a disk cartridge carrying a disk for recording information, a sliding plate for moving the cartridge holder toward and away from a turntable, a motor for rotatively driving the turntable, and a frame holding the motor and having a bottom plate along which the sliding plate slides for disk cartridge loading and ejecting operations. The motor supporting parts of the frame is raised slightly from the bottom plate of the frame toward the cartridge holder so that part of the sliding plate is allowed to extend in the clearance between the bottom plate and the motor supporting parts of the frame and the clearance between the bottom plate and part of the motor facing the bottom plate, for free sliding movement.

1 Claim, 14 Drawing Sheets

LOADING/EJECTING MECHANISM IN DISK DRIVING DEVICE HAVING SLIDING PLATE BELOW THE TURNTABLE MOTOR

BACKGROUND OF THE INVENTION

1. Field of the Invention

The present invention relates to a disk driving device for rotatively driving a disk-shaped information recording medium, such as a magnetic disk or an optical disk, to record or to reproduce information and, more particularly, to a disk driving device suitable for a so-called still video floppy disk and capable of intermittently moving a magnetic head radially of a magnetic disk rotating at a high rotating speed, and recording still video signals on or reproducing still video signals recorded on a track corresponding to a position where the magnetic head is located stationarily.

2. Description of the Prior Art

An exemplary disk driving device for recording and/or reproducing still video signals is disclosed in Japanese Patent Provisional Publication No. 58-57667. This known disk driving device has a cassette holder pivotally joined at one end thereof for swing motion to a base plate provided with a turntable. After receiving a magnetic sheet jacket (hereinafter referred to as "disk cartridge") therein, the cassette holder is turned toward the base plate to load the disk cartridge on the turntable. In the disk driving device of this kind, the cassette holder is formed integrally with a cover member, and the cover member is closed to move the disk cartridge downward to load the disk cartridge on the turntable. Accordingly, this disk driving device is designated as a top-loading type of disk driving device.

In addition to the top-loading type of disk driving device, a front-loading type of disk driving device is known. Generally the front-loading type of disk driving device comprises a holder which moves between a loading position and an ejecting position, a sliding plate which is always biased toward the disk cartridge inserting side, and raises or lowers the holder relative to the turntable during horizontal movement, and cam means formed in frame members along which the sliding plate slides. The cam means converts the movement of the disk cartridge parallel to the upper surface of the turntable into vertical movement of the same for disk cartridge loading and ejecting operations.

The top-loading type of disk driving device is simple in construction, because the cover member is pressed directly by the operator for loading the disk cartridge, which is advantageous in respect of the simplicity of the mechanism. However, the top-loading type of disk driving device has problems that the necessity of a space for opening the cover member restricts its intergrations with other equipment, that the disk cartridge loading operation is troublesome because the disk cartridge loading operation requires two kinds of actions, namely, inserting a disk cartridge into the holder, and then pressing the cover member toward the turntable, and that the position of the disk driving device is restricted in incorporating the disk driving device into other equipment and hence the design of the disk driving device is accompanied with many restrictions because the disk driving devices requires a space for opening the cover member.

On the other hand, in the front-loading type of disk driving device, the loading of a disk cartridge on the turntable can be achieved simply by inserting the disk cartridge into the holder. Accordingly, the front-loading type of disk driving device has advantages that the casing needs only a disk cartridge inserting opening not requiring any additional space for opening a cover member and that there is no restriction on the place of installation. The sliding plate of the front-loading type of disk driving device slides along a frame holding the components of the disk driving device including the turntable, the turntable driving mechanism, positioning pins and the carriage shifting mechanism. Therefore, the parts disposed in the vicinity of a predetermined path of the disk cartridge extending between the loading position and the ejecting position need to be formed so that the movement of the disk cartridge along the path is not obstructed and the sliding plate needs to be formed as thin as possible, and hence, in some cases, it is impossible to provide the sliding plate with a sufficient strength, which is a problem particularly in designing the disk driving device in a compact construction. Furthermore, the motor for driving the turntable is projected from the frame on the side opposite the side where the turntable is disposed so that the motor will not obstruct the movement of the sliding plate, which restricts the reduction of the disk driving device in thickness.

SUMMARY OF THE INVENTION

Accordingly, it is an object of the present invention to provide a disk driving device having a compact construction and a reduced thickness.

In order to solve the foregoing problems of the conventional disk driving devices and to achieve the object of the invention, the present invention provides a disk driving device comprising a cartridge holder for holding a disk cartridge having a case carrying a disk for recording information, a sliding plate for moving the cartridge holder toward and away from a turntable, a motor for rotatively driving the turntable, and a frame supporting the motor and having a bottom plate along which the sliding plate slides for disk cartridge loading and ejecting operations, characterized in that the motor supporting parts of the frame is raised slightly from the bottom plate of the frame toward the cartridge holder so that part of the sliding plate is allowed to extend in the clearance between the bottom plate and the motor supporting parts of the frame and the clearance between the bottom plate and part of the motor facing the bottom plate, for free sliding movement.

Such a constitution according to the present invention permits the disposition of a connecting plate for interconnecting portions of the sliding plate, for example, the opposite side walls of the sliding plate, to fix the position of the side walls opposite to the surface of the motor remote from the turntable, and the sliding movement of the sliding plate in the clearance between the bottom plate and the surface of the motor remote from the turntable, and the clearance between the bottom plate and the motor holding member spaced apart from the bottom plate. Accordingly, the sliding plate is provided with a sufficient strength. Furthermore, since a space, which has been a useless space in the conventional disk driving device, is utilized for disposing the sliding plate, the external dimensions of the disk driving device can be reduced. Still further, since the motor does not project from the frame, the thickness of the disk driving device can be reduced.

The above and other objects, features and advantages of the present invention will become more apparent from the following description taken in conjunction with the accompanying drawings.

BRIEF DESCRIPTION OF THE DRAWINGS

The drawings illustrate a preferred embodiment of the present invention, in which.

DESCRIPTION OF THE PREFERRED EMBODIMENT

General Constitution

Figure 2:
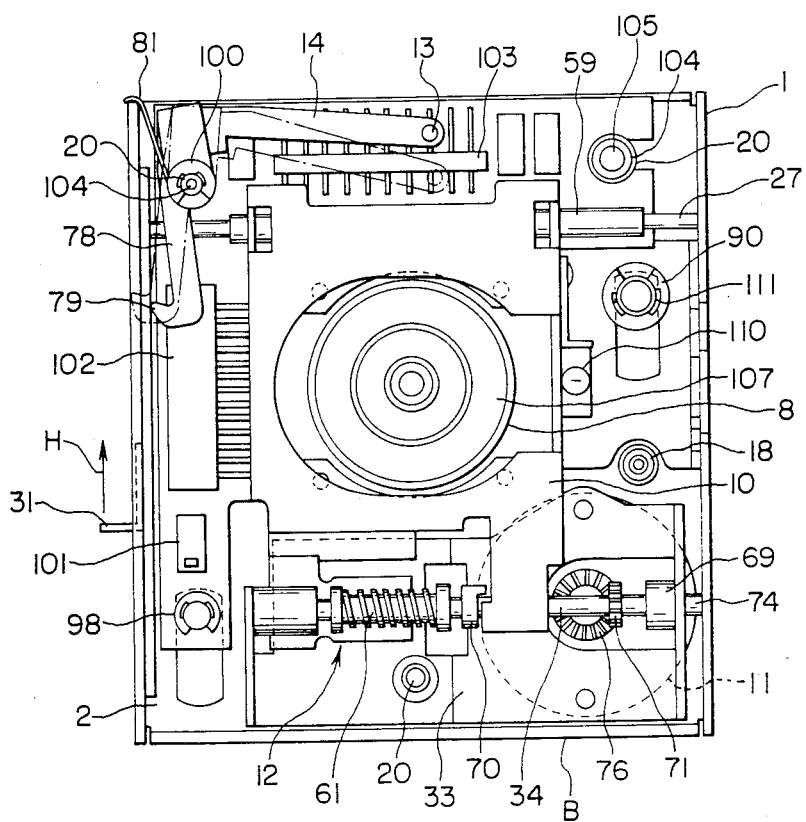
FIG. 2 is a plan view of a disk driving device, in a preferred embodiment, according to the present invention.
Figure 3:
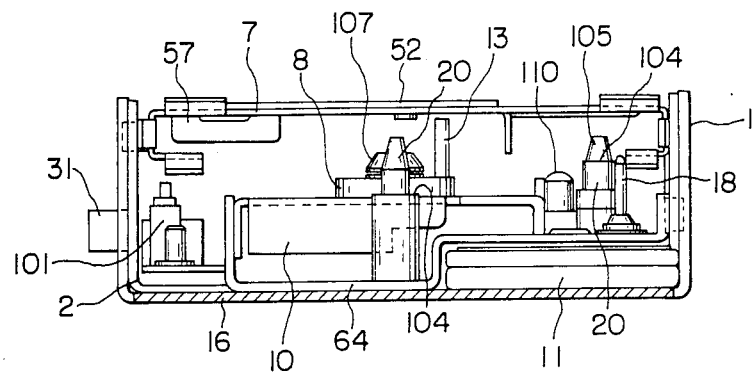
FIG. 3 is a front elevation of the disk driving device of FIG. 2.

The general constitution of a disk driving device, in a preferred embodiment, according to the present invention will be described hereunder with reference to FIGS. 2 to 14. The overall assembly is shown in FIGS. 2 and 3, whereas a frame 1 thereof is shown more particularly in FIGS. 4–7, and a sliding plate 2 thereof is shown more particularly in FIGS. 8–10.

Figure 10:
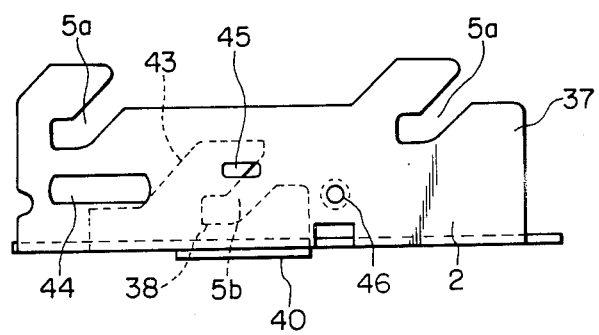
FIG. 10 is a side elevation of the sliding plate.

The disk driving device comprises, as the principal components thereof, the frame 1 having side plates 24 and 25; the sliding plate 2 having side plates 37 and 38 extending adjacent to the side plates 24 and 25 of the frame 1 and provided with cam grooves 5a and 5b, respectively, and capable of sliding in vertical directions, as viewed in FIG. 10 over the upper surface of the frame 1; a cartridge holder (hereinafter referred to simply as "holder") 7 for holding a disk cartridge 50, provided on the side surfaces thereof with projections 6a and 6b engaging the cam grooves 5a and 5b of the side plates 37 and 38 of the sliding plate 2, respectively; a motor 9 for rotatively driving a turntable 8, attached to the upper surface of the frame 1 and constituting a disk driving mechanism in combination with the turntable 8; a carriage 10 disposed above the upper surface of the frame 1 and capable of being transferred in the radial direction with respect to a disk 51; a carriage transferring mechanism 12 for transferring the carriage 10, including a stepping motor 11; and a locking lever 14 for regulating the sliding movement of the sliding plate 2, disposed at the innermost place of the device with respect to the direction of insertion of the cartridge 50, and provided with a control pin 13.

Figure 7:
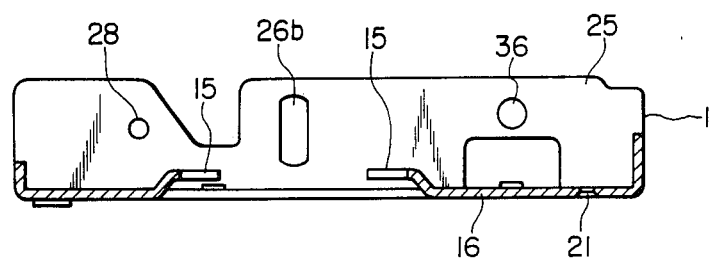
FIG. 7 is a sectional view taken on line A—A in FIG. 5.

The frame 1 is formed in dimensions close to the external dimensions of the disk cartridge 50 by bending a metallic plate. As illustrated in FIG. 7, a portion of the bottom plate 16 of the frame 1 is raised to form motor supporting parts 15 in the central portion of the bottom plate 16. A holding part 17 for holding a carriage transferring unit 33, which will be described later, is formed in the disk cartridge receiving side B of the frame 1. Two holes 19 for attaching pad adjusting pins 18 to the bottom plate 16 are formed in the bottom plate 16. Three holes 21 for attaching positioning pins 20 for supporting the disk cartridge during the loading operation to the bottom plate 16 are formed in the bottom plate 16 one in the disk cartridge receiving side B and two near the opposite corners of the opposite side. A holding part 23 for holding one end of an extension spring 22 for always resiliently biasing the sliding plate 2 toward the disk cartridge receiving side B is formed in the bottom plate 16 of the frame 1.

Figure 6:
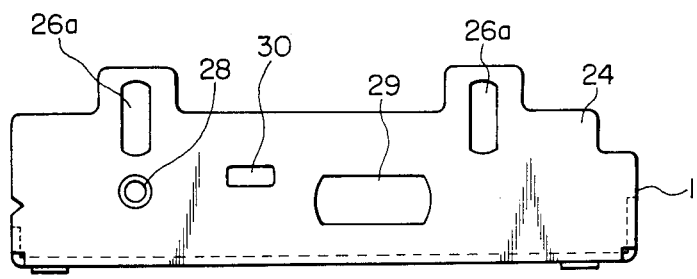
FIG. 6 is a side elevation of the frame.

The opposite sides of the frame 1 are bent up to form the side plates 24 and 25. Two guide grooves 26a for guiding the projections 6a, respectively, are formed in the side plate 24 on the left side, as viewed from the disk cartridge receiving side B, of the frame 1. A hole 28 for attaching a guide shaft 27 to the frame 1 is formed in the side plate 24 on the side opposite the disk cartridge receiving side. As illustrated in FIG. 6, openings 29 and 30 are formed in the central portion of the side plate 24 as clearances to allow the movement of an ejecting lever 31 and the locking lever 14, respectively. As illustrated in FIG. 7, a guide groove 26b for guiding the projection 6b, and a supporting hole 36 for receiving the projection 74 of a bearing 69 for supporting the screw shaft 34 of the carriage transferring unit 33 are formed in the side plate 25 formed on the right side, as viewed from the disk cartridge receiving side B, of the frame 1.

Figure 8:
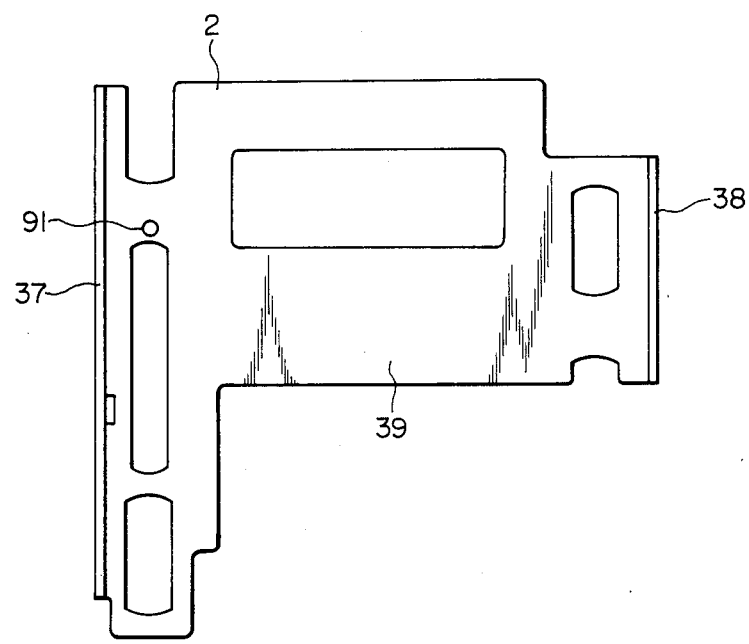
FIG. 8 is a plan view of the sliding plate.
Figure 9:
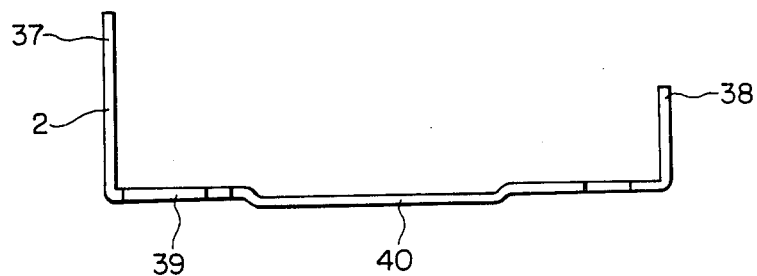
FIG. 9 is a front elevation of the sliding plate.

As illustrated in FIG. 8, the sliding plate 2 is an integral member comprising the side plates 37 and 38 and a connecting plate 39 connecting the side plates 37 and 38. As illustrated in FIG. 9, the central portion of the connecting plate 39 is depressed toward the bottom plate 16 of the frame 1 to form a depressed part 40. The depressed part 40 extends below the motor supporting parts 15, so that the depressed part 40 is slidable between the motor supporting parts 15. Cam grooves 5a and a cam groove 5b for engaging the projections 6a and 6b projecting from the holder 7 are formed in the side plates 37 and 38, respectively. An inclined cam surface 43 for guiding a cam plate 42, namely, a regulating member, having a pad 41 is formed in the right side plate 38, namely, the side plate on the right side as viewed from the disk cartridge receiving side B, on the side opposite the disk cartridge receiving side B. As illustrated in FIG. 10, an opening 44 for receiving the guide shaft therethrough and an opening 45 for engaging the hook of the locking lever 14 are formed in the left side plate 37. A hole 46 for attaching the ejecting lever 31 to the sliding plate 2 is formed in the left side plate 37 of the sliding plate 2.

Figure 11:
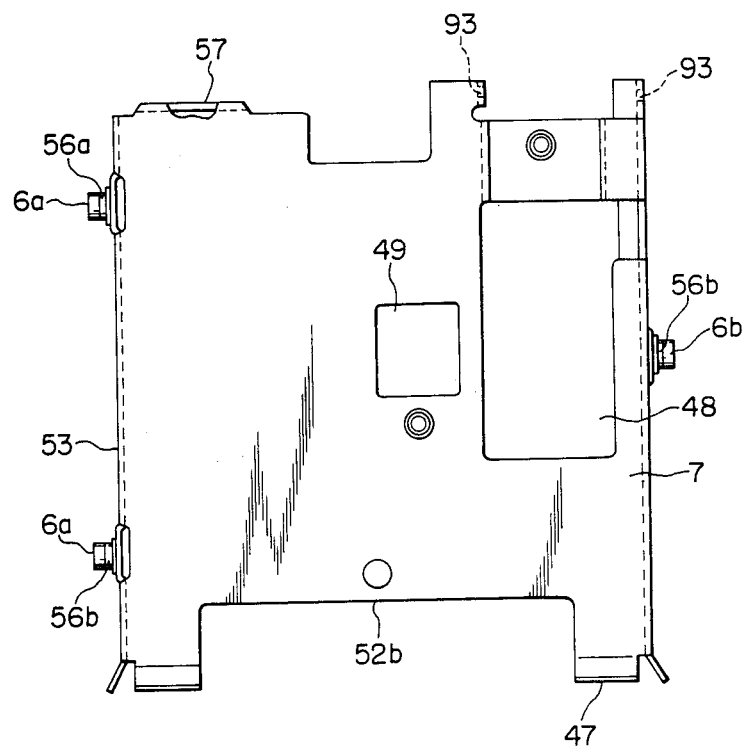
FIG. 11 is a plan view of a cartridge holder.
Figure 12:
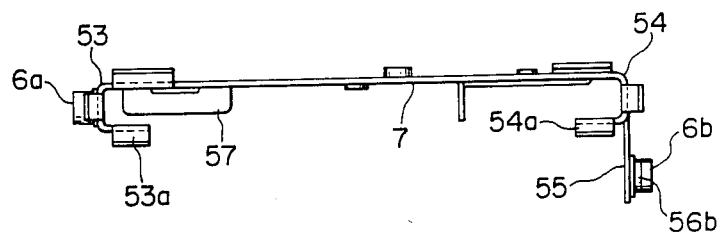
FIG. 12 is a front elevation of the cartridge holder.
Figure 13:
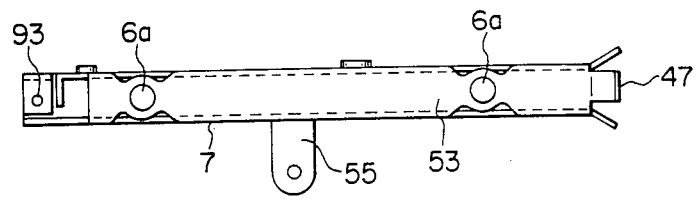
FIG. 13 is a left-hand side elevation of the cartridge holder.
Figure 14:
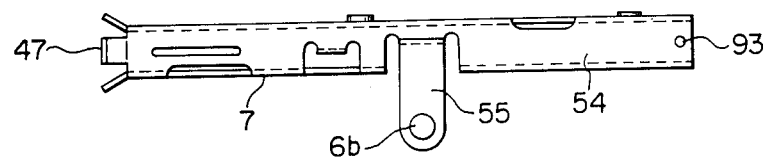
FIG. 14 is a right-hand side elevation of the cartridge holder.

Referring to FIGS. 11 to 14, a mouth 47 for receiving the disk cartridge 50 therethrough is formed at the front end, namely, the lower end as viewed in FIG. 11, of the holder 7. An opening 48 for inserting the pad of the cam plate 42 into the holder 7, and a detection opening 49 for a pulse generating sensor (hereinafter referred to as "PG sensor") are formed in the upper wall of the holder 7.

The two projections 6a projects from the outer surface of the left side wall 53, namely, the side wall on the left side in FIG. 11, while an integral elastic lug 55 depends from the right side wall 54. The projection 6b is attached to the extremity of the elastic lug 55. In this embodiment, rollers 56a and 56b are fitted rotatably on the projections 6a and 6b for rolling engagement with the cam grooves 5a and 5b, respectively. A stopper 57 for locating the disk cartridge 50 at a fixed position within the holder 7 is formed at the rear end, namely, the end opposite the mouth 47, of the holder 7. The side facing the turntable 8 of the holder 7 is entirely open. The lower edges of the side walls 53 and 54 are bent inward to form supporting walls 53a and 54a, respectively, for supporting the disk cartridge 50.

Figure 15:
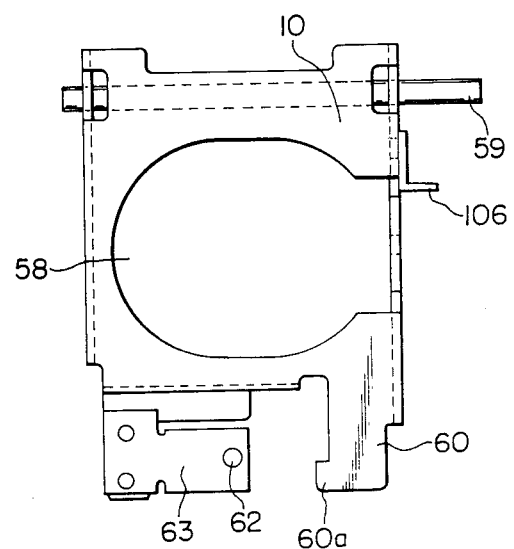
FIG. 15 is a plan view of the carriage.
Figure 16:
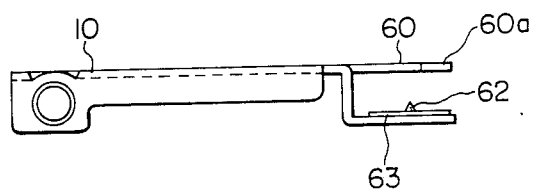
FIG. 16 is a side elevation of the cartridge.

As illustrated in FIGS. 15 and 16, a turntable receiving opening 58 for rotatably receiving the turn table 8 therein is formed in the carriage 10. An elongate bearing 59 for slidably receiving the guide shaft 27 therethrough is attached to the upper end, as viewed in FIG. 15, of the carriage 10. Bearing metals are fitted in the opposite ends of the bearing 59, respectively. As viewed in FIG. 15, a positioning arm 60 which rests on the screw shaft 34 of the carriage transferring mechanism 12 on the side of the holder 7 to fix the height of the carriage 10, and a leaf spring 63 supporting a projection 62 which engages the thread of the screw 61 of the screw shaft 34 on the side of the bottom plate 16 are provided in the lower portion of the carriage 10. Thus, the screw shaft 34 is received diametrically between the positioning arm 60 and the leaf spring 63. A bracket 106 for holding a magnetic head 110 is screwed to the outer surface of the right wall, namely, the wall on the right side as viewed in FIG. 15, of the carriage 10. The magnetic head 110 held on the bracket 106 writes information in the disk 51.

Figure 1:
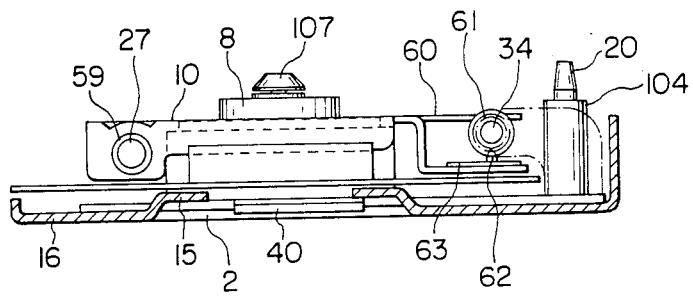
FIG. 1 is a sectional view showing the disposition of a frame, a sliding plate, a carriage and a motor.
Figure 17:
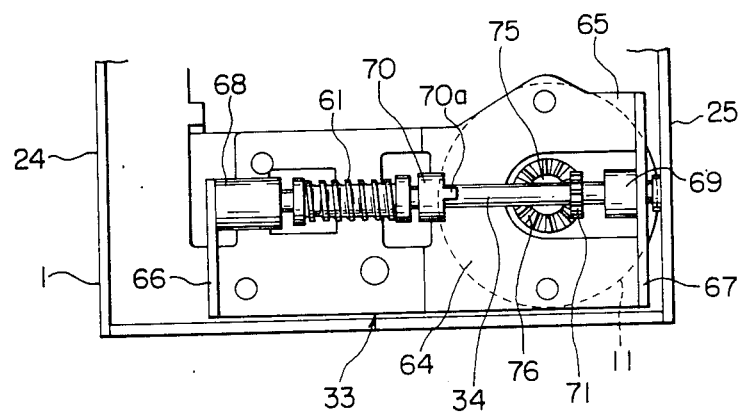
FIG. 17 is a plan view showing the essential portions of the frame and a carriage transferring mechanism.
Figure 18:
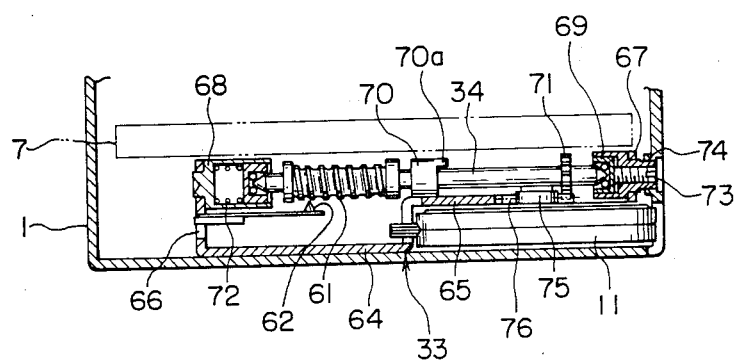
FIG. 18 is a front elevation showing the essential portions of the frame and the carriage transferring mechanism.

Referring to FIGS. 1, 17 and 18, the carriage transferring unit 33 comprises, as the principal components, a supporting plate 64, the stepping motor 11 and the screw shaft 34. As shown in FIG. 18, the supporting plate 64 is bent in the form of two steps. The stepping motor 11 is attached to the lower surface, as viewed in FIG. 18, of a stepping motor holding part 65 extending above the bottom plate 16. The screw shaft 34 is supported in bearings 68 and 69 attached to the opposite side walls 66 and 67 of the supporting plate 64. Thus, the screw shaft 34 and the stepping motor 11 are mounted on the supporting plate 64 to constitute the cartridge transferring unit 33.

The screw 61 of the screw shaft 34 for intermittent drive is the same as that disclosed in the invention of the applicant of the present application, published in Japanese Utility Model Provisional Publication No. 60-67564. The pitch of the screw 61 is so chosen that the axial displacement of the projection 62 engaging the thread of the screw 61 when the screw shaft 34 is turned through a predetermined angle of rotation coincides with the pitch of recording tracks of the disk 51. The screw shaft 34 is mounted with a stopper 70 and a spur gear 71. The projection 70a of the stopper 70 comes into engagement with the projection 60a of the positioning arm 60 to restrict the rotation of the screw shaft 34 so that the transfer of the carriage 10 beyond a limit is stopped.

The bearings 68 and 69 supporting the screw shaft 34 at the opposite conical ends thereof have pivot bearing elements, respectively. The bearing 68 biases the screw shaft rightward, as viewed in FIGS. 17 and 18, with a compression spring 72. The bearing 69 is provided with an adjusting screw for adjusting the axial position of the screw shaft 34. The bearing 69 is supported on the side wall 67 with an end portion 74 receiving the adjusting screw projecting outside from the side wall 67 and received in the supporting hole 36 of the side plate 25 of the frame 1 to fix the height of the carriage transferring unit 33.

The spur gear 71 mounted on the screw shaft 34 engages a crown gear 76 fixed to the output shaft 75 of the stepping motor 11 attached to the supporting plate 64 to transmit the stepping motion of the stepping motor 11 to the screw shaft 34. Thus, the stepwise rotation of the stepping motor 11 is transmitted through the screw 61 to the carriage 10 to move the carriage 10 linearly at every stepping rotation of the stepping motor 11.

Figure 19:
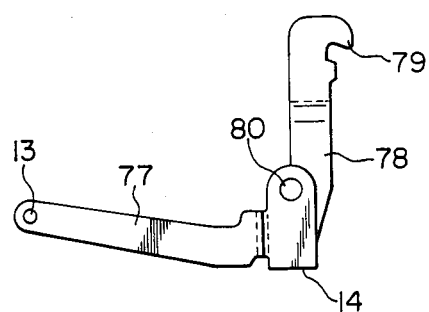
FIG. 19 is a plan view of a locking lever.
Figure 20:
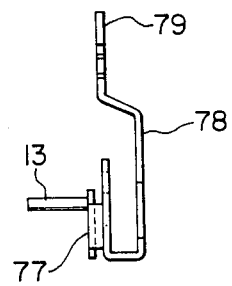
FIG. 20 is a side elevation of the locking lever.
Figure 21:
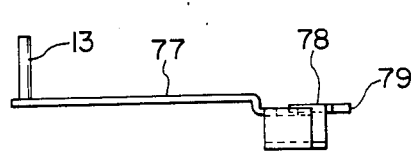
FIG. 21 is a rear view of the locking cam.

Referring to FIGS. 19 to 21, the locking lever 14 is formed practically in an L-shape and has a control arm 77 extending leftward as viewed in FIG. 19, the control pin 13 projecting from the extremity of the control arm 77, and a catching arm 78 having a hook 79 formed in the extremity thereof. The control arm 77 and the catching arm 78 extend substantially perpendicularly to each other. A hole 80 for rotatably receiving a positioning pin 20 is formed at the junction of the control arm 77 and the catching arm 78. When the disk cartridge 50 is brought into contact with the control pin 13 to turn the locking lever 14 counterclockwise, as viewed in FIG. 19, about the center axis of the hole 80, the hook 79 of the catching arm 78 is removed from the edge of the opening 45 of the sliding plate 2. The locking lever 14 is always biased clockwise, as viewed in FIG. 2, by a spring 81.

Figure 23:
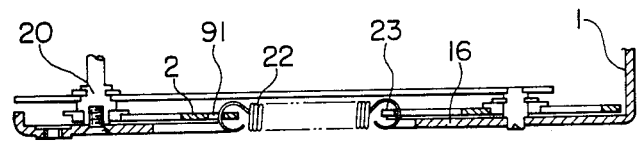
FIG. 23 is a sectional view showing a spring and the essential portion of spring connecting means.

The pad adjusting pin 18 is fixed to the frame 1. The tip of the pad adjusting pin 18 projects from the opening 48 of the holder 7 to locate the pad 41 of the cam plate 42 correctly relative to a magnetic head 110. As illustrated in FIG. 23, the pad adjusting pin 18 comprises a cylindrical body 83 having a central through hole 82 having a shoulder 83a in the lower portion thereof, an adjustable pin 86 having an internal thread 84 in the central portion of the lower end thereof, a flange 89 and a contact head 85, and an adjusting screw 87 inserted into the through hole 82 of the cylindrical body 83 from the lower end of the same and engaging the internal thread 84 of the adjustable pin 86. A spring washer 88 is inserted between the upper end of the cylindrical body 83 and the flange 89 of the adjustable pin 86 with the head thereof resting on the shoulder 83a of the through hole 82 to enable the fine adjustment of the projection of the adjustable pin 86 from the cylindrical body 83 within the range of distortion of the spring washer 88.

Figure 4:
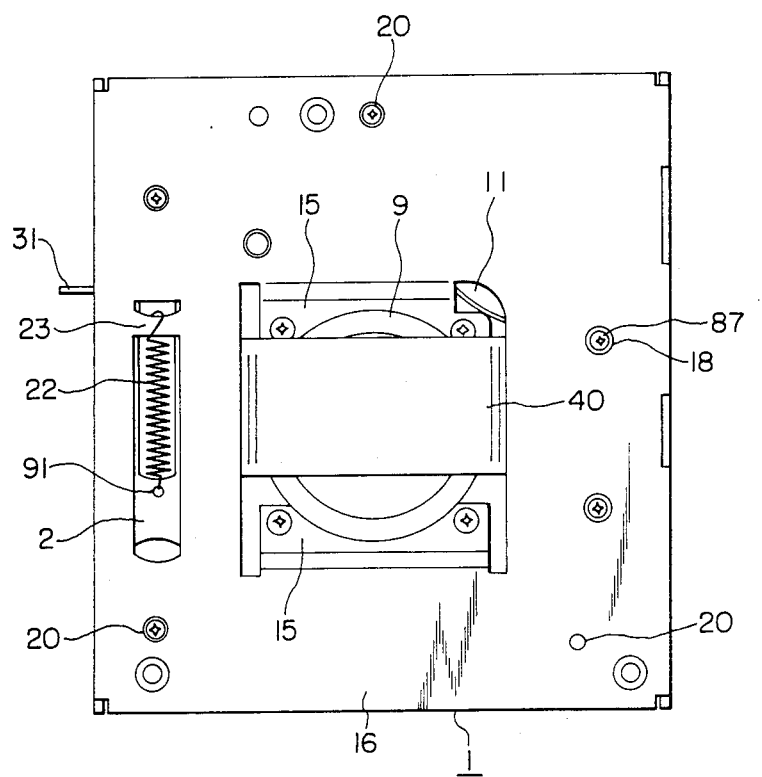
FIG. 4 is a bottom plan view of the disk driving device of FIG. 2.
Figure 22:
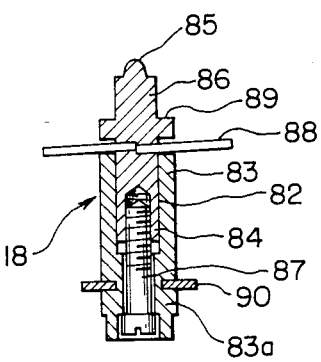
FIG. 22 is a sectional view of a pad adjusting pin.

As illustrated in FIG. 4, the pad adjusting pin 18 is inserted in the hole 19 of the bottom plate 16 of the frame from the upper side of the bottom plate 16, and then the lower end of the cylindrical body 83 is caulked to fasten the pad adjusting pin 18 to the bottom plate 16. Indicated at 90 in FIGS. 2 and 22 is an E-ring for holding the sliding plate 2.

As illustrated in FIGS. 4 and 23, the extension spring 22 always biasing the sliding plate 2 toward the disk cartridge receiving side B has one end connected to the holding part 23 of the bottom plate 16 and the other end connected to a hole 91 formed in the bottom plate 39 of the sliding plate 2. The extension spring 22 is extended properly so that the coils thereof will not project below the bottom plate 16.

Figure 24:
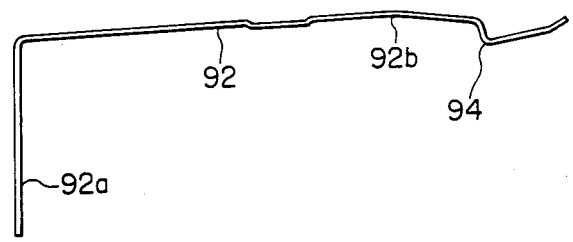
FIG. 24 is a plan view of a shutter closing spring.

Referring to FIG. 24, a spring 92 for closing a shutter 50e has a short linear arm 92a inserted in a hole 93 formed in the holder 7 in the side poosite the disk cartridge receiving side, and a long arm 92b having a bent portion 94 to be placed in contact with one end 50g of the shutter 50e to close the shutter 50e in ejecting the disk cartridge 50. The bent portion 94 decides the position of the shutter 50e relative to the holder 7.

Figure 25:
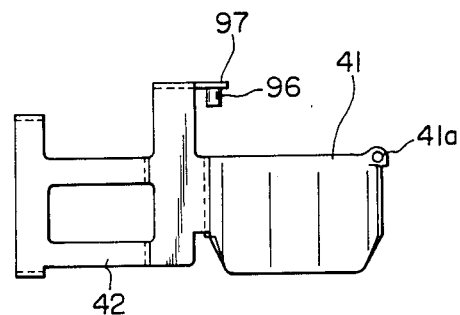
FIG. 25 is a plan view of a cam plate.
Figure 26:
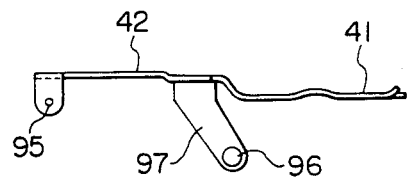
FIG. 26 is a front elevation of the cam plate.
Figure 27:
FIG. 27 is an enlarged fragmentary view of the pad portion of the cam plate.
Figure 30:
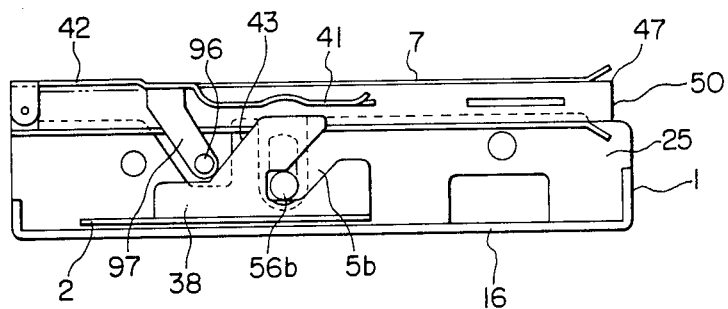
FIGS. 30, 31, 32 and 33 are side elevations for explaining the actions of the cam plate.
Figure 31:
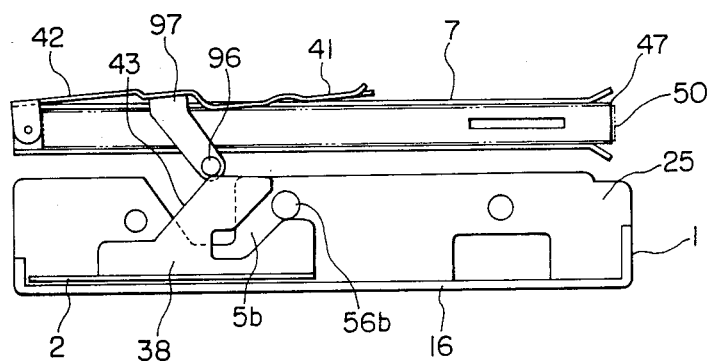

Referring to FIGS. 25 to 27, the cam plate 42 has a pad 41 as illustrated in FIG. 27. The short linear arm 92a of the spring 92 is inserted rotatably through a hole 95 formed in the base end of the cam plate 42 and in the hole 93 of the holder 7 to pivotally attach the cam plate 42 to the holder 7. The cam plate 42 has an arm 97 and a roller 96 rotatably attached to the free end of the arm 97. The roller 96 rolls along the cam surface 43 formed in the side plate 38 of the sliding plate 2. In unloading the holder 7, the pad 41 of the cam plate 42 is located above the upper surface of the holder 7 as illustrated in FIG. 31 while, in loading the holder 7, the pad 41 of the cam plate 42 is located within the holder 7 to press the disk 51 as illustrated in FIG. 30.

The recording/reproducing disk cartridge 50 comprises, as the principal components, a disk 51, namely, a disk-shaped magnetic sheet, as a magnetic recording medium, and a case 50a formed of a hard synthetic resin for containing the disk 51. A hub 51c having an opening 51a for receiving a fixed shaft (or a spindle) 107 provided at the center of the turntable 8 and a magnetic ring 51b is provided in the central portion of the disk 51. An opening 50b is formed in the central portion of the case 50a to expose the hub 51c. The opening 51a of the hub 51c has two diagonal slides 51d and a resilient pressing part 51e for pressing a rotary member attached to the fixed shaft 107 to center-align the disk 51 with the fixed shaft 107. When the disk 51 is put in place, the magnetic ring 51b attached to the hub 51c is located opposite to a magnetic ring 108 incorporated into the turntable 8 which rotates on the fixed shaft 107 at a high rotating speed. When the turntable 8 is rotated, the disk 51 is rotated in synchronism with the turntable 8 by the agency of the magnetic attraction between the magnetic ring 51b and the magnetic ring 108 for recording operation.

Figure 35:
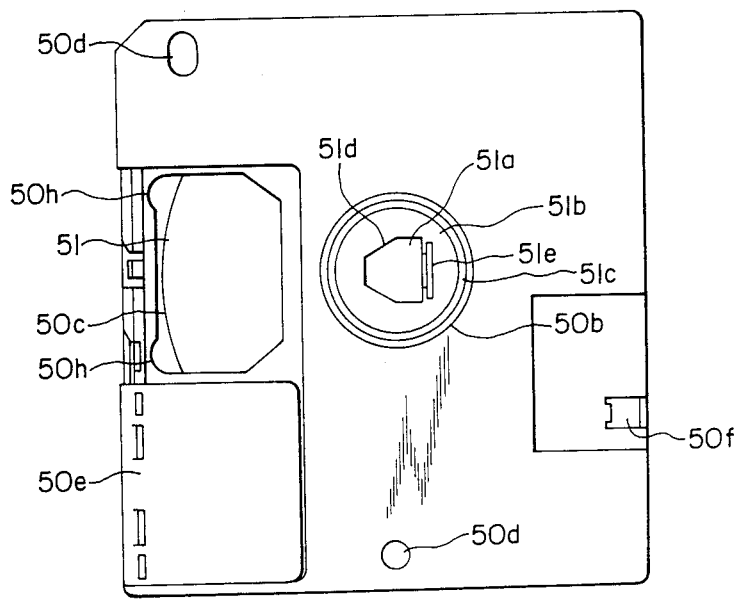
FIG. 35 is a bottom view of the disk cartridge of FIG. 34.

The case 50a is provided, in addition to the opening 50b for receiving the fixed shaft 107 therethrough, an opening 50c for exposing the disk 51 to the magnetic head 110, and a positioning opening 50d for receiving the positioning pin 20 therein. A sliding shutter 50e for covering the opening 50c is attached to the case 50a. A write inhibit notch 50f is formed in the surface facing the turntable 8 of the case 50a. The projection of the write inhibit notch 50f is broken to inhibit rewriting. As illustrated in FIG. 35, practically semicircular recesses 50h are formed in the upper and lower left-hand corners of the opening 50c, respectively. A portion of the adjustable pin 86 and the contact head 85 project into the case 50a through the recess 50h to locate the disk 51 correctly relative to the magnetic head 110 without requiring the contact of the pad 41 with the case 50a.

The general constitution of the disk driving device will be described in detail with reference to FIGS. 2 to 4.

Figure 5:
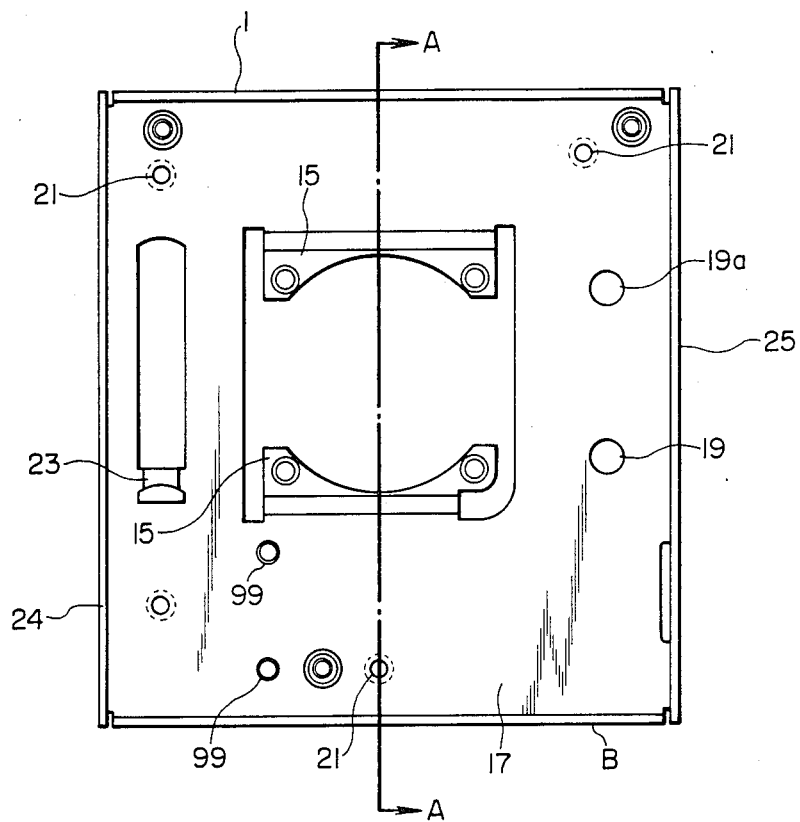
FIG. 5 is a plan view of the frame.

The sliding plate 2 is mounted slidably on the bottom plate 16 of the frame 1 with the depressed part 40 of the connecting plate 39 thereof extended below the motor supporting parts 15 best shown in FIGS. 5 and 7. The high-speed motor 9 is screwed in place to the motor supporting parts 15.

The position of the sliding plate 2 on the bottom plate 16 of the frame 1 is determined by part of the positioning pin 20, the E-ring 90 fitted on one of the pad adjusting pins 18 and another E-ring 98.

The carrage transferring unit 33 is secured to the bottom plate 16 by screwing screws into the threaded holes 99 of the bottom plate 16 (FIG. 5) with the end portion 74 of the bearing 69 received in the supporting hole 36 of the side plate 25 of the frame 1. Thus, the carriage transferring unit 33 is secured to the frame 1 at three positions, namely, the two threaded holes 99 and the supporting hole 36.

The carriage 10 is supported on the guide shaft 27 fixedly supported on the side plates 24 and 25, and the screw shaft 34 of the carriage transferring unit 33 for lateral movement, as viewed in FIG. 2.

The locking lever 14 is supported pivotally on the positioning pin 20 provided at an upper left-hand position, as viewed in FIG. 2, and is held in place with an E-ring 100. In a state illustrated in FIG. 2, the disk cartridge 50 is inserted into the holder 7, the holder 7 is located at the loading position, the control pin 13 is shifted upward, as viewed in FIG. 2, and thereby the locking lever 14 is turned counter-clockwise to disengage the hook 78 from the edge of the opening 45 of the sliding plate 2, so that the sliding plate is shifted to the disk cartridge receiving side B. Accordingly, the ejecting lever 31 attached to the side plate 37 of the sliding plate 2 also is located at a position in the opening 29 of the frame 1 nearest to the cartridge receiving side B, as illustrated in FIG. 2.

A sensor 101 for detecting the write inhibit notch 50f of the disk cartridge 50 is provided on the bottom plate 16 on the disk cartridge receiving side B to decide whether or not writing is permitted. A connector 102 for interconnecting signal lines for transmitting control signals for controlling the motor 9, and a connector 103 for interconnecting write signal lines are disposed near the side plate 24 and in the side opposite the disk cartridge receiving side B.

As shown in FIG. 3, the positioning pin 20 has a shoulder 104 and a positioning head 105. The positioning head 105 is fitted in the positioning opening 50d and the shoulder 104 supports the case 50a at the lower surface of the same to position the case 50a.

The projections 6a extending from the left side wall 53 of the holder 7 through the cam grooves 5a of the left side plates 37 of the sliding plate 2 into the guide grooves 26a of the left side plate 24 of the frame 1. The projection 6b projects from the elastic lub 55 through the cam groove 5b of the right side plate 38 of the sliding plate 2 into the guide groove 26b of the right side plate 25 of the frame 1. Thus, the holder 7 is disposed between the side plates 24 and 25 of the frame 1 only for movement in vertical directions. The roller 96 of the cam plate 42 is rotatable along the cam surface 43 of the side plate 38 of the sliding plate 2.

Loading Operation

The manner of loading operation of the disk driving device thus constituted will be described hereinafter.

Figure 32:
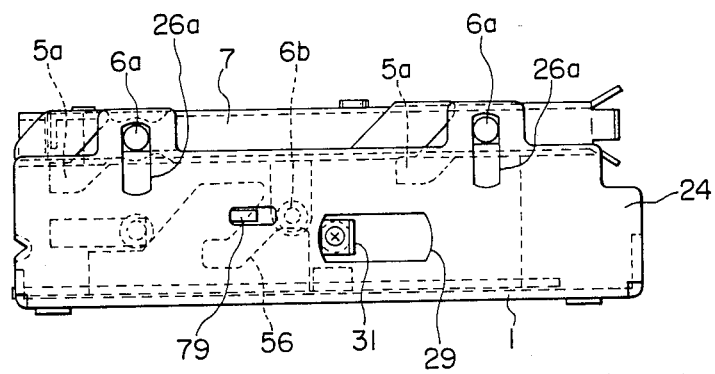

Before the disk cartridge 50 is inserted into the holder 7, the holder 7 is located at the uppermost position, namely, the farthest position from the turntable 8, as shown in FIGS. 30 and 32. In this state, the projections 6a and 6b are positioned at the respective uppermost parts of the guide grooves 26a and 26b and on the respective upper horizontal parts of the cam grooves, respectively, while the hook 79 of the locking lever 14 is in engagement with the edge of the opening 45 of the sliding plate 2 to retain the sliding plate 2 at the rearmost position opposite the disk cartridge receiving side B.

Figure 28:
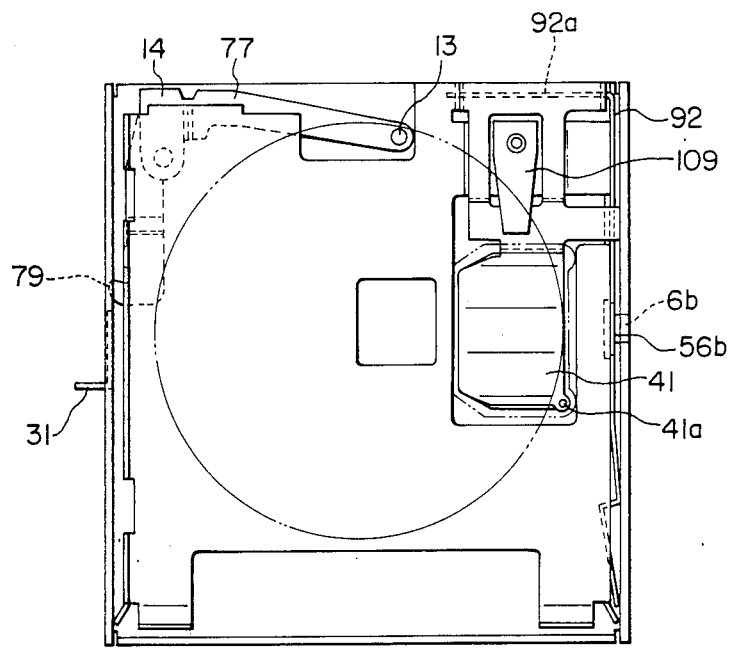
FIGS. 28 and 29 are plan view for explaining the action of the cam plate.
Figure 29:
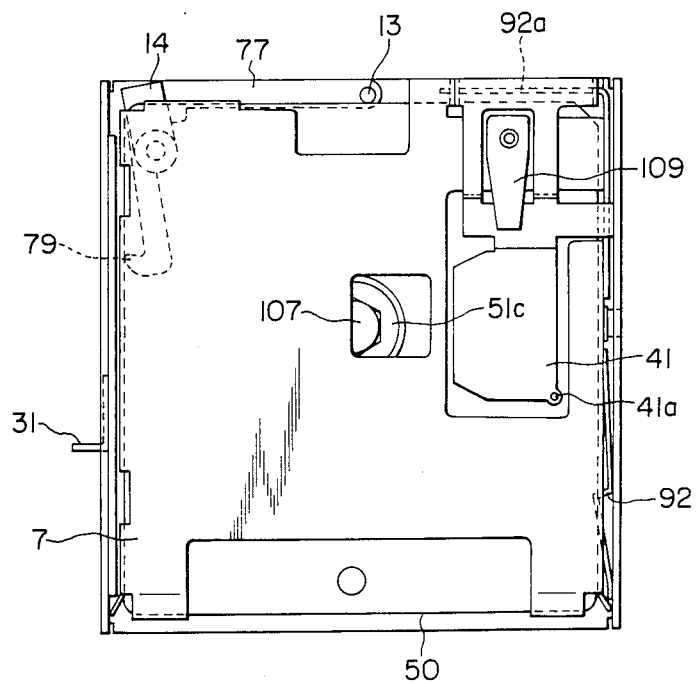
Figure 33:
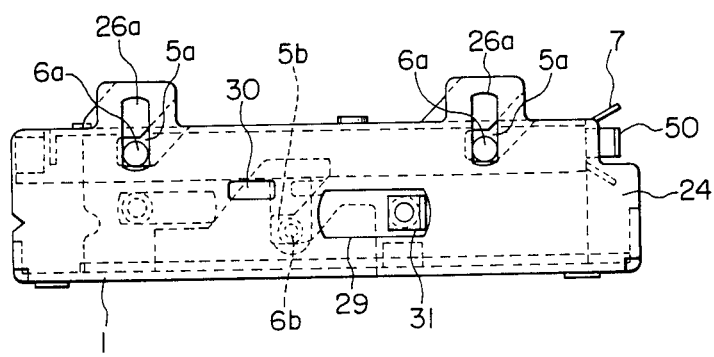
Figure 34:
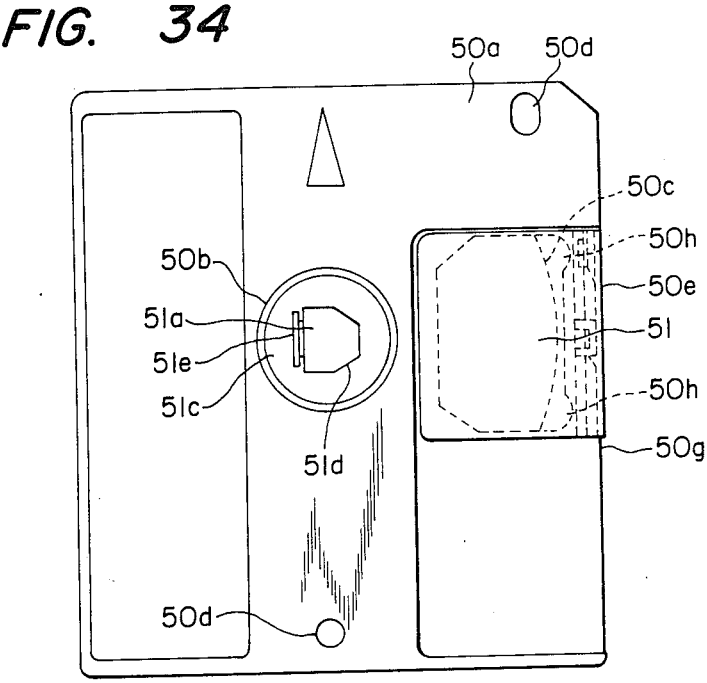
FIG. 34 is a plan view of a disk cartridge.

When the disk cartridge 50 is inserted into the holder 7, the front end of the case 50a comes into abutment with the control pin 13 as illustrated in FIG. 28. As the disk cartridge 50 is inserted further into the holder 7, the locking lever 14 is turned counterclockwise by the case 50a, and thereby the hook 79 is disengaged from the edge of the opening 45 of the sliding plate 2 as illustrated in FIG. 29. Consequently, the sliding plate 2 is caused to slide toward the disk cartridge receiving side B by the resilience of the extension spring 22 always biasing the sliding plate 2 toward the disk cartridge receiving side B. Then, as illustrated in FIGS. 30 and 33, since the rollers 56a and 56b of the projections 6a and 6b roll along the cam grooves 5a and 5b, and the projections 6a and 6b are fitted in the guide grooves 26a and 26b of the frame 1, the holder 7 is moved vertically toward the turntable 8 as the sliding plate 2 is shifted toward the cartridge receiving side B. The downward movement of the disk cartridge 50 is limited by the shoulder 104 of the positioning pin 20. The disk cartridge 50 is unable to move downward after the lower surface of the case 50a thereof has come into contact with the shoulder 104 of the positioning pin 20. While the disk cartridge is lowered, the opening 51a formed in the hub 51c of the disk 51 receives the fixed shaft 107 (the spindle) and, when the disk cartridge 50 is lowered to the lowermost position, the opening 51a firmly receives the rotary member fitted on the fixed shaft 107.

While the loading operation is proceeding, the roller 96 of the camp plate 42 moves along the cam surface to allow the pad 41 to enter into the holder 7 and to finally come into contact with the surface of the disk 51. A leaf spring 109 applies an appropriate pressure through the pad 41 to the disk 51.

Ejecting Operation

In ejecting the disk cartridge 50 after the completion of the recording and/or reproducing operation, an ejecting lever 31 projecting through the opening 29 of the side plate 24 of the frame 1 is moved in the direction of arrow H (FIG. 2), namely, in direction opposite the disk cartridge receiving side, whereby the sliding plate 2 is moved in the direction of arrow H. Upon the coincidence of the opening 45 of the sliding plate 2 with the hook 79 of the locking lever 14, the locking lever 14 is turned clockwise by the spring 81, so that the hook 79 engages the edge of the opening 45. While the sliding plate 2 is moved in the direction of arrow H, the holder 7 is raised as the rollers 56a and 56b of the projections 6a and 6b are raised by the cam grooves 5a and 5b of the sliding plate 2, so that the hub 51c of the disk 51 is separated from the fixed shaft 107 of the turntable 8. As the locking lever 14 is turned clockwise by the spring 81, the control pin 13 pushes the case 50a at the front end of the same to move the disk cartridge 51 toward the disk cartridge receiving side B to eject the disk cartridge 51. As the sliding plate 7 is moved away from the cartridge receiving side B, the roller 96 of the cam plate 42 is raised by the cam surface 43 to turn the cam plate 42 counterclockwise, as viewed in FIG. 30, so that the pad 41 is separated from the disk 51 to a position above the holder 7. Accordingly, the disk 51 is ejected without hindrance.

As evident from what has been described hereinbefore, the front-loading type of disk driving device according to the present invention has the following advantages.

(1) Elimination of the need for an additional space for opening a cover member enhances the degree of integration of equipments.

(2) The accessibility of the disk driving device is improved.

(3) The degree of freedom in designing the disk driving device is increased, which is advantageous in incorporating the disk driving device into other equipments.

(4) The disposition of part of the sliding plate below the motor for driving the turntable enables forming a sliding plate having a sufficient strength for a compact disk driving device.

(5) The disposition of part of the sliding plate below the motor for driving the turntable utilizes a space which has been useless in the conventional disk driving device, which facilitates forming the disk driving device in a compact construction.

(6) The disposition of part of the sliding plate below the motor for driving the turntable and the disposition of the motor within the confines of the frame enable the reduction of the thickness of the disk driving device.

As is apparent from the foregoing description, according to the present invention, part of the sliding plate is disposed below the motor for driving the turntable, and hence the opposite side plates of the sliding plate can be held by a connecting plate having a sufficient strength, and the disposition of the connecting plate in a space which has been useless in the conventional disk driving device improves the space factor of the disk driving device, which enables forming the disk driving device in a compact construction. Furthermore, the disposition of the motor within the confines of the frame by disposing part of the sliding plate, namely, the connecting plate, below the motor, enables the reduction of the thickness of the disk driving device.

Although the invention has been described in its preferred form with a certain degree of particularity, it is to be understood that many variations and changes are possible in the invention without departing from the scope and spirit thereof.

What is claimed is:

1. A loading/ejecting mechanism for a disk driving device comprising:
- a frame for said device having a bottom plate in one plane, side walls, and a motor mounting part formed by a portion of said bottom plate being raised upward so as to be spaced by a given spacing above the plane of said bottom plate;
- a motor mounted on said motor mounting part of said bottom plate of said frame;
- a turntable supported in said frame above said motor which is rotatively driven by said motor;
- a horizontal cartridge holder movably supported in said frame vertically above said turntable for receiving and holding a disk cartridge inserted horizontally therein along an insertion direction, said cartridge holder having a pair of sides in parallel with said insertion direction and side projections projecting therefrom; and
- a sliding plate movable in horizontal sliding movement on said bottom plate of said frame in parallel with said insertion direction, and having a pair of side plates extending vertically upwards and which are spaced apart in parallel with said insertion direction for accomodating said cartridge holder therebetween, said side plates having inclined cam grooves formed therein which are engaged with said side projections of said cartridge holder for guiding said cartridge holder vertically downward onto and upward from said turntable in conjunction with the sliding movement of said sliding plate, and a lower connecting plate connecting the two side plates of said sliding plate, wherein a portion of said lower connecting plate is slidable in the given spacing under said motor mounting part of said bottom plate in conjunction with the sliding movement of said sliding plate, whereby said disk driving device is formed with a compact construction of its part and allows a reduction in its thickness.

* * * * *